United States Patent [19]

Meyer et al.

[11] Patent Number: 5,026,534

[45] Date of Patent: Jun. 25, 1991

[54] PROCESS FOR THE PREPARATION OF AQUEOUS AMMONIUM THIOCYANATE SOLUTIONS

[75] Inventors: Gerhard Meyer, Obernburg; Gunter Sudheimer, Darmstadt; Hans Zengel, Kleinwallstadt; Hans Grothaus, Cologne, all of Fed. Rep. of Germany

[73] Assignee: Akzo N.V., Netherlands

[21] Appl. No.: 512,497

[22] Filed: Apr. 20, 1990

Related U.S. Application Data

[63] Continuation of Ser. No. 18,822, Feb. 24, 1987, abandoned, which is a continuation of Ser. No. 836,072, Mar. 4, 1986, abandoned.

[30] Foreign Application Priority Data

Mar. 8, 1985 [DE]   Fed. Rep. of Germany ....... 3508404

[51] Int. Cl.$^5$ .............................................. C01C 3/20
[52] U.S. Cl. .................................................... 423/366
[58] Field of Search ......................................... 423/366

[56] References Cited

U.S. PATENT DOCUMENTS

| | | |
|---|---|---|
| 2,249,962 | 7/1941 | Lento, Jr. et al. . |
| 2,286,273 | 6/1942 | Hill ........................ 423/366 |
| 2,850,356 | 9/1958 | Sutherland et al. . |
| 3,615,177 | 10/1971 | Magerlein et al. ................ 423/366 |

FOREIGN PATENT DOCUMENTS

| | | |
|---|---|---|
| 1297088 | 2/1970 | Fed. Rep. of Germany . |
| 1592341 | 8/1970 | Fed. Rep. of Germany . |
| 2362923 | 6/1975 | Fed. Rep. of Germany ...... 423/366 |
| 121800 | 11/1974 | Japan .................................. 423/366 |

*Primary Examiner*—Wayne A. Langel
*Attorney, Agent, or Firm*—Oliff & Berridge

[57] ABSTRACT

Aqueous ammonium thiocyanate solutions are prepared continuously by reaction of ammonia with carbon disulfide in the presence of water using activated carbon as catalyst at pressures of from 2 to 7 bar. In this way, a very pure product can be obtained. The process can be carried out at very low cost, because both the addition of ammonia to carbon disulfide and the decomposition of the resulting ammonium dithiocarbamate can be carried out in a reactor in one step under identical conditions.

21 Claims, 2 Drawing Sheets

PROCESS FOR THE PREPARATION OF AQUEOUS AMMONIUM THIOCYANATE SOLUTIONS

This is a continuation of application Ser. No. 07/018,822 filed Feb. 24, 1987 (now abandoned), which in turn was a continuation of application Ser. No. 06/836,072 filed Mar. 4, 1986 (now abandoned).

BACKGROUND OF THE INVENTION

The invention relates to a process for the continuous preparation of aqueous ammonium thiocyanate solutions by reaction of ammonia with carbon disulfide in the presence of water using activated carbon as catalyst.

Thiocyanates (rhodanides) in the form of their alkali or ammonium salts are chemicals that not only are frequency used in chemical laboratories, but are also extremely important in other technical fields. Thus, for example, an aqueous thiocyanate solution is frequently used as a precipitation bath during the wet spinning of polyacrylonitrile. Thiocyanates can also be employed for the preparation of polyacrylonitrile solutions. Thiocyanates used for this purpose have high requirements.

Some processers for the preparation of thiocyanates consist, first, in preparing an aqueous solution of ammonium thiocyanate. This solution can be processed further into solid ammonium thiocyanate likewise in a manner known per se or reacted with the hydroxide of an alkali metal to alkali-metal thiocyanate.

The preparation of ammonium thiocyanate and aqueous ammonium thiocyanate solutions by reaction of ammonia with carbon disulfide in the presence of water has long been known in the art. Thus U.S. Pat. No. 2,249,962 describes the reaction of ammonia with carbon disulfide in a boiler in the presence of water and a catalyst. Fatty acids, especially oleic acid or ammonium fatty acid salts, tall oil, or high alcohols are used as the catalyst. The reaction is carried out in the presence of alcohols a solubilizers. One of the disadvantages of this process is the presence of the solubilizer, which must be removed after the reaction is completed. The catalysts employed cause problems during the processing of the reaction mixture. Therefore, the separation of the undesirable constitutents and the purification of the end product are very costly. Moreover, the catalyst must be renewed frequently. In addition, sulfur forms during the reaction, which likewise leads to processing problems. Since the reaction is carried out in several stages at various temperatures, the process technology is complicated.

U.S. Pat. No. 2,850,356 describes the reaction of ammonia and carbon disulfide in a reactor which consists of three zones and is provided with packing material, e.g., Raschig rings. Although this patent, too, mentions that processes for the reaction of ammonia with carbon disulfide under pressure are known, it is recommended that the process be carried out at standard pressure, if necessary at a slightly elevated pressure up to about 1.7 bar. The reaction is carried out in such a way that temperatures of 35°, 55° and 80° C. are established in the three stages (zones). The process does not use a catalyst.

Accepted West German Patent Application No. 1,297,088 describes a process in which activated carbon is used as a catalyst. Here, too, the reaction is carried out in three stages. Accepted West German Patent Application No. 1,592,341 discloses an improvement of the process disclosed in Accepted West German Patent Application No. 1,297,088, and describes the reaction of gaseous carbon disulfide at temperatures of from 70° to 90° C.

The processes described in the last two patents already lead to high reaction rates and high yields of ammonium thiocyanate with purities exceeding 99%.

Ever-increasing requirements for the quality of ammonium thiocyanate and the efficiency and cost-effectiveness of the manufacturing process, however, lead to the demand for other processes that would result in higher efficiency and greater economies.

SUMMARY OF THE INVENTION

Therefore, the invention has as an object the provision of a process that, particularly in comparison to the process as described in Accepted West German Patent Applications 1,297,088 and 1,592,341, will produce still greater improvements of the reaction rate and will enable one further to increase the purity of the ammonium thiocyanate produced.

Another advantage of the invention is to provide a process that can be managed as simply and as continuously as possible and carried out with less energy expended than in prior processes.

The above object is achieved with a process for the continuous production of aqueous ammonium thiocyanate solutions by reaction of ammonia with carbon disulfide in the presence of water or aqueous ammonium thiocyanate solutions using activated carbon as catalyst, and is characterized by the fact that the reaction of ammonia with carbon disulfide and the decomposition of the resulting intermediate take place at a temperature of 90° to 150° C. and at a pressure between 2 and 7 bar.

DETAILED DESCRIPTION OF THE INVENTION

Preferably, gaseous carbon disulfide is used for the reaction. In an advantageous embodiment of the process incorporating the invention, the reaction of ammonia with carbon disulfide and the decomposition of intermediates occur at a temperature between 110° and 120° C. Particularly preferable is a pressure range between 5 and 5.5 bar. Advantageously, the intermediates produced during the reaction are decomposed in situ. The reaction of ammonia with carbon disulfide and the decomposition of the intermediates can be carried out in a zone in which, advantageously, during the reaction and decomposition a constant temperature and a constant pressure are maintained and the reaction zone extends over the entire packed catalyst bed. Of particular advantage is the use of the heat generated during the reaction of ammonia with carbon disulfide for the decomposition of the resulting intermediates formed.

The resulting ammonium thiocyanate solution can be drawn off continuously and expanded to standard pressure, with the emerging gases being dissolved in water and returned to the reaction space. The resulting ammonia thiocyanate solution can also be drawn off continuously and expanded to standard pressure, with the escaping gases being compressed and returned to the reaction space.

Advantageously, the aqueous ammonium thiocyanate solution is recycled and passed through a heat exchanger to dissipate the heat of reaction. In a particularly advantageous embodiment of the process of the invention, a packed bed reactor with recycling of the ammonium thiocyanate solution is employed for the reaction of carbon disulfide and ammonia. Ammonia can be metered into the reaction vessel in the liquid state or the gaseous state. Advantageously, ammonia is metered into the ammonium thicyanate circuit in the liquid or gaseous state. Ammonia or an aqueous ammonia solution containing ammonium thiocyanate can be metered into the reaction vessel with carbon disulfide in counterflow. Ammonia or an aqueous ammonium solution containing thiocyanate can also be metered into the reaction vessel with carbon disulfide in parallel flow.

Preferably, the amount of water employed is so proportioned that the resulting aqueous ammonium thiocyanate solution contains 40 to 50 weight percent ammonium thiocyanate.

Therefore, the process comprises continuously feeding carbon disulfide, ammonia, and water to a suitable reactor containing the desired amount of activated carbon and in continuously drawing off the ammonium thiocyanate solution formed during the reaction. Preferably, ammonia and carbon disulfide are brought to the pressure and temperature prevailing in the reactor before they are metered into the reactor. Preferably, the carbon disulfide is totally vaporized before metering. Ammonia can be metered in the liquid or the gaseous state.

"Gaseous carbon disulfide" as used herein signifies that carbon disulfide is subject to a partial pressure in the reactor at which the carbon disulfide is in the gaseous state. The vapor pressures of carbon disulfide as a function of temperature are listed, for example, in "Ullmanns Enzyklopaedie der Technischen Chemie", 4th ed., Vol. 21, p. 87ff, Verlag Chemie Weinheim. "Constant temperature" and "constant pressure" as used herein mean that balanced (homogeneous) pressure and temperature ratios exist in the reactor zone, wherein, needless to say, normal apparatus-induced fluctuations and those due to control engineering are tolerated. "Zone" as used herein signifies a three-dimensional section in a reactor in which a certain process takes place under essentially identical conditions. Thus, for example, the reactor described in Accepted West German Patent Application 1,297,088 in the form of a reaction tube is divided into three zones, namely a zone c, in which the reaction between ammonia and carbon disulfide occurs in a first stage, a zone b, which is used for the metering of ammonia and carbon disulfide, and a zone a, in which the decomposition of dithiocarbamate and trithiocarbonate is effected.

Figure 1:
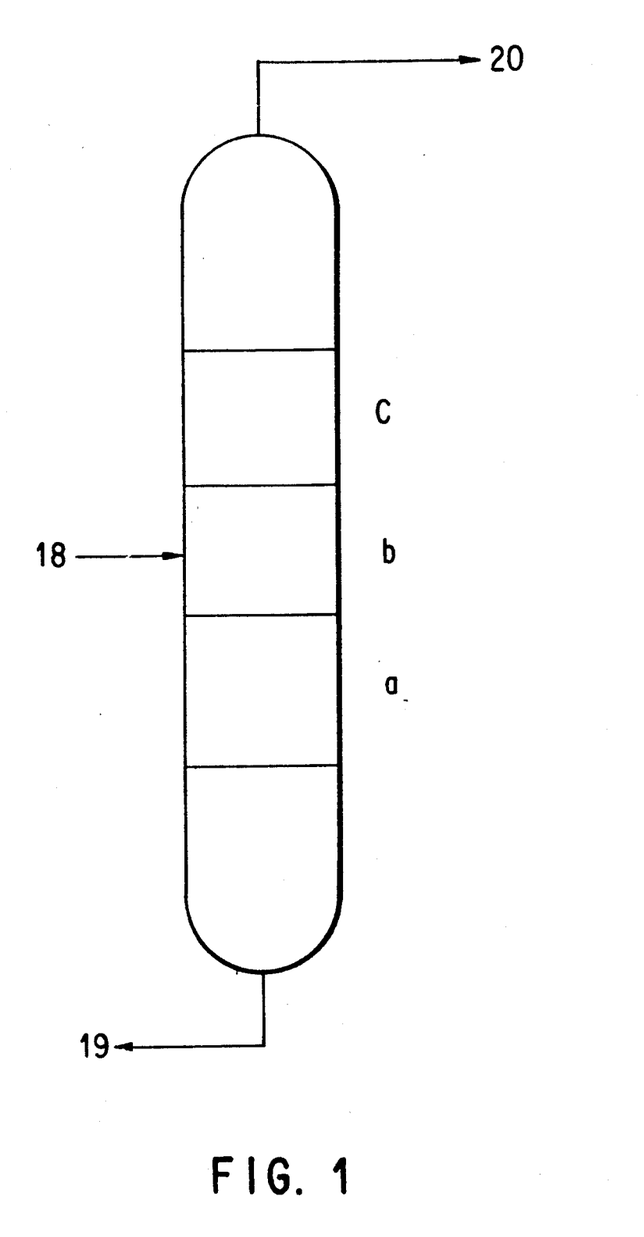
FIG. 1 depicts a schematic view of apparatus for practicing the process of the invention.

Preferably, the process of the invention is carried out in a zone containing the entire packed catalyst bed, but, in principle, it can also be carried out in the apparatus shown schematically in FIG. 1. In this case, one c, for example, can be packed with activated carbon to catalyze the reaction of ammonia with carbon disulfide. The necessary starting materials can be metered into zone b through one or more metering lines 18. The decomposition of ammonium thiocarbamate and ammonium trithiocarbonate can be carried out in zone a. Line 19 is used to discharge the resulting ammonium thiocyanate solution. Waste gases such as hydrogen sulfide and unreacted carbon disulfide, etc., are discharged through line 20.

Essentially the following reactions take place in the reactor:

Primary reactions:

Secondary reaction:

The (exothermic) first step in the reaction is an addition of one molecule of ammonia to one molecule of carbon disulfide, whereby ammonium dithiocarbamate is formed with another ammonia molecule. The ammonium dithiocarbamate is decomposed into ammonium thiocyanate and hydrogen sulfide in the (endothermic) second step.

In the secondary reactions, ammonium trithiocarbonate is formed with ammonia, carbon disulfide, and hydrogen sulfide, and decomposed in situ at the indicated temperature to form ammonium thiocyanate and hydrogen sulfide.

The hydrogen sulfide is drawn off at the end of the packed catalyst bed and can be transferred to a Claus unit. Since this type of unit normally also operates at an elevated pressure, compression or expansion of the drawn-off hydrogen sulfide is unnecessary.

Since a preferred embodiment of the novel process, as explained in greater detail below, consists in using slightly less than the stoichiometric amount of ammonia, the hydrogen sulfide removed from the reactor still contains some carbon disulfide and some water.

The water fed to the reactor should be free of oxygen to prevent the partial oxidation of the resulting hydrogen sulfide into sulfur, which would settle on the catalyst.

Water is used during the reaction, primarily for the purpose of removing the resulting ammonium thiocyanate as a solution from the surface of the activated carbon and from the reactor.

In a preferred embodiment of the novel process, the continuously withdrawn ammonium thiocyanate solution is expanded to standard pressure, and the emerging gases are dissolved in water and returned to the reaction space. These gases comprise small amounts of hydrogen sulfide and ammonia. In this way, total conversion of the ammonia in use is achieved. A surprising finding was that the resulting ammonium thiocyanate solution contained only relatively small amounts of dissolved $H_2S$ and $NH_3$ even if pressures of 2-7 bar were applied during the reaction. At 5.5 bar, the total amount of these gases was, for example, a maximum of 1 weight percent, referred to the weight of the solution. This amount can be removed entirely by expansion to standard pressure.

The ammonium thiocyanate solution from which gases have been removed can be processed as desired, e.g., into alkali-metal thiocyanate or solid ammonium thiocyanate.

The reaction according to the invention is carried out at a pressure between 2 and 7 bar, i.e., at a pressure greater than standard pressure (which is about 1 bar). The use of a higher pressure leads to advantages over processes carried out at standard pressure, which will be described below. These advantages can be achieved even at relatively low gauge pressures, e.g., even at a pressure of 2 bar. However, at pressure of about 3 bar or higher, they become quite evident. On the other hand, major improvements can no longer be achieved at very high pressures, so that, for example, economic considerations do not support the use of very high pressures. It proved especially beneficial to carry out the process of the invention at a pressure of from 5 to 5.5 bar. It was found that the space-time yield of ammonium thiocyanate can almost be doubled at pressures within this range when compared to a standard pressure. This is attributable to the fact that the coating of the catalyst surface with ammonia and carbon disulfide, and thereby the reaction rate, increase with higher pressure.

On the other hand, before carrying out the tests that led to the novel process, one would expect that at elevated pressures the resulting hydrogen sulfide would heavily coat the catalyst and would be desorbed only at a slow rate, which would have resulted in insufficient space-time yields. By way of example, a comparison between absorption isotherms of carbon disulfide, ammonia, and hydrogen sulfide for the types of activated carbon Supersorbon WS and IV at 20° C. showed that hydrogen sulfide is better adsorbed than ammonia. Surprisingly, this anticipated slow-down of the reaction rate, which would have argued against the use of an elevated pressure, was not observed.

The use of an elevated pressure during the reaction not only leads to faster adsorption and increased coating of the catalyst, it also enables one to establish reaction temperatures that are higher than can be used in a process using activated carbon at standard pressure. If standard pressure is used, the upper temperature limit (which preferably is not exceeded) for the first reaction step of adding ammonia to carbon disulfide in the upper reaction region is about 90° C. On the other hand, if a higher pressure is used, the temperature can be raised to 100° C. or higher without causing the space-time yield to drop.

The higher temperature leads to an increase in the rate at which ammonia is added to carbon disulfide, and the use of a higher temperature for the addition step produces yet another advantage: since higher temperatures are more desirable for the (endothermic) decomposition of ammonium dithiocarbamate than for the addition of $NH_3$ to $CS_2$, uniform temperatures can be maintained in the entire reactor. Thus, the reactor need not be divided into different temperature zones. This division into several zones is customary for a process carried out at standard pressure, because the reaction step of adding $NH_3$ to $CS_2$ is carried out at a lower temperature than the decomposition of ammonium dithiocarbamate.

A preferred embodiment of the process taught by the invention is characterized by the fact that the reaction is carried out at temperatures between 100° C. and 130° C. With this embodiment, the lower limit of 100° C. results from the fact mentioned earlier, namely, that above this temperature the ammonium dithiocarbamate formed in the first step decomposes completely into ammonium thiocyanate within a very short time. Therefore, the upper limit of 130° is adhered to, because more secondary reactions were observed above this temperature.

If the process of the invention is carried out according to the preferred embodiment described above, according to which the process occurs at a uniform temperature between 100° C. and 130° C., another advantage is achieved when compared with a pressureless process using different temperature zones. This advantage lies in the fact that the addition of ammonia to carbon disulfide occurs at a temperature at which nascent ammonium dithiocarbamate and ammonium trithiocarbonate decompose on the catalyst's surface. This is advantageous, because byproducts, for example, thiourea, can form from the reaction mixture if the residence time is relative long. The extent of these thiourea-producing secondary reactions increases with the residence time and higher temperatures. With the process of the invention, greater purity of the ammonium thiocyanate can be achieved than with processes of the prior art.

In the case of the process of the invention, if it is carried out at a temperature ranging from 100° C. to 120° C., ammonium thiocyanate having a purity of at least 99.7% can be obtained. Therefore, in a preferred embodiment the process is carried out at a temperature between 110° C. and 120° C.

Since the first step of the reaction, the addition of ammonia to carbon disulfide, is exothermic and the second step, which leads to thiocyanate, is endothermic, the heat generated in the first step is used advantageously for the decomposition of the ammonium dithiocarbamate. Thus, the operation in a one-step process, during which a uniform temperature prevails in the reactor, enables one to operate without costly external devices in order to attain different reaction temperatures. The operating temperature is maintained by the heat produced within the system itself. This permits the use of a relatively inexpensive packed bed reactor.

A preferred embodiment of the novel process includes the dissipation of the resulting heat by an ammonium thiocyanate circuit using heat exchangers. The excess heat largely results from the heat of solution of gaseous ammonia in the reaction solution and can be dissipated simply, if the gaseous ammonia is metered into the ammonium thiocyanate circuit outside the reactor.

If, on the other hand, as described in prior processes, the decomposition steps are carried out in separate reactors, more expensive apparatus such as, for example tube-nest reactors, must be used on account of the techniques required for supplying and dissipating heat.

On the basis of the stoichiomeric equation for the overall reaction, two molecules of ammonia with one molecule of carbon disulfide to form ammonium thiocyanate and hydrogen sulfide. Consequently, these two components can be used in a stoichiometric molar ratio, i.e., in a 2:1 ratio. However, a preferred embodiment of the process consists in using a given deficiency of ammonia, i.e., to set the molar ratio of ammonia to carbon disulfide at values between 2:1.02 and 2:1.1.

In this way, the formation of small amounts of ammonium sulfide from ammonia and from the resulting hydrogen sulfide is reduced or avoided.

Depending on the values of the pressures and temperatures selected, some of the carbon disulfide is present in the reactor in the liquid or gaseous state. Preferably, the reaction is carried out under conditions where the carbon disulfide is in the gaseous state. Pressure and temperature must be so selected that the water in the reactor is in the liquid state, so that a solution of ammonium thiocyanate can be produced.

Preferably, the activated carbon serving as catalyst is used in granular form. In this case, a packed bed reactor, for example, is filled with the desired amount of granular activated carbon, so that a catalyst layer is obtained which, on the one hand, has a large surface area and, on the other, allows gases and liquids to pass.

How much activated carbon must be present in the reactor in order, for all practical purposes, to achieve a complete conversion within a short time, depends upon process parameters and can easily determined by test runs in each particular case. The required amount of activated carbon depends upon the pressure and temperature in the reactor and on the amounts of ammonia and carbon disulfide charged continuously per unit time.

Activated carbon suitable for the process of the invention includes, among others, the produce Supersorbon K (manufacturer: Lurg: Lurgi Umwelt and Chemotechnik GmbH), grain size 4 mm, sifting density 400 kg/m$^3$, BET surface area 1200 m$^2$/g.

According to the invention, the starting components, carbon disulfide and ammonia or ammoniacal ammonium thiocyanate solution, can be fed to the catalyst bed in parallel or counterflow. A preferred embodiment of the process of the invention consists in feeding from above, in parallel flow, ammonia and gaseous carbon disulfide dissolved in the above-mentioned recycle streams, and passing the evolving waste gases, hydrogen sulfide, downstream of the catalyst bed with a vertical pipe through a cooler. This results in the advantage that high gas and liquid rates, referred to the catalyst cross-sectional area, can be used without flooding the reaction vessel. The reactor of an industrial plant can be given a relatively small diameter, which results in considerable saving for one of the above-mentioned pressure reactors. In a counter flow process, the gas and liquid rates are limited by the flood point, so that a relatively large reactor diameter is needed.

In a preferred embodiment of the process, the amount of continously metered water for the waste gas cooler and for the residual gas absorption is so proportioned that the resulting ammonium thiocyanate solution contains 40 to 50 weight percent ammonium thiocyanate. The cost of further processing to obtain a solid product rises with lower concentrations of thiocyanate.

Gases that escape during the expansion of the aqueous ammonium thiocyanate solution to standard pressure can also be compressed and returned to the reaction vessel.

Figure 2:
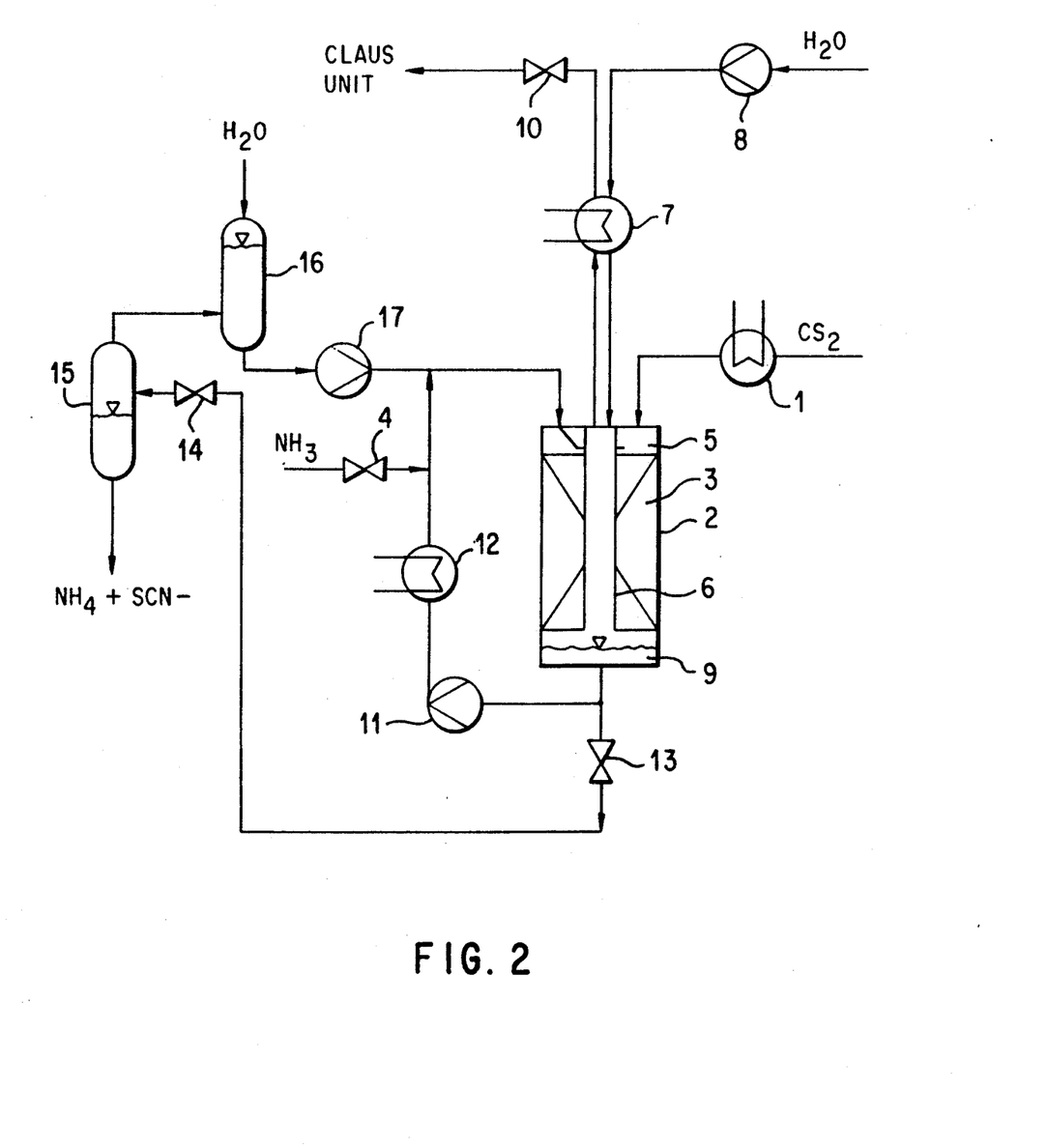
FIG. 2 depicts a schematic view of apparatus for practicing another process of the invention.

Another advantageous embodiment of the process taught by the invention is described with reference to FIG. 2. This figure is a simplified schematic representation of a machine in which this process modification is carried out.

Downstream of an evaporator 1, carbon disulfide is fed at reaction pressure to the reaction vessel 2 above the packed catalyst bed 3. By means of a valve 4, ammonia is brought to the reaction pressure, then dissolved in an ammonium thiocyanate circuit and fed to the packed catalyst bed by means of a distributor ring 5. The resulting waste gas, hydrogen sulfide, is fed to a cooler 7 via a vertical pipe 6, then cooled and washed to remove ammonia and byproducts. The oxygen-free water is fed by means of a pump 8 into the waste gas cooler, then through the vertical pipe to the sump of the reactor 9. The waste gas can be fed at reaction pressure via a valve 10 to a Claus unit for reprocessing.

The resulting ammonium thiocyanate solution is recycled by pump 11 and heat exchanger 12 in order to dissipate the heat of reaction.

The filling level of the sump of the reactor 9 is controlled by valve 13. The ammonium thiocyanate solution is totally degased by valve 14 to remove ammonia and hydrogen sulfide by expansion to atmospheric pressure. The purified ammonium thiocyanate solution can be drawn off from the degaser 15. The degaser waste gas is dissolved in water in an absorber 16 and by means of a pump 17 returned to the ammonium thiocyanate circuit.

Advantageously, if the reaction is carried out in this manner, only one reactor zone, which is very simple to manage from the process and control engineering point of view, is needed.

A very surprising finding was that an unexpected increase in the space-time yield was obtained with the use of the novel process. Apparently, the evolving hydrogen sulfide does not hamper the catalyst effect of the activated carbon under the temperature and pressure conditions according to the invention, but rather enhances it.

Also worthy of note was the fact that the process of the invention permits both the reaction of carbon disulfide with ammonia and the decomposition of the resulting intermediate to occur at the same site. i.e., in one zone where essentially a constant temperature and a constant pressure are maintained. This constitutes a considerable process-related simplification over processes of prior art where the reaction took place in tower- or column-type reactors in three steps or in three different zones, and in which a different temperature had to be maintained in each zone. Therefore, the process taught by the invention can be carried out in very simple fashion and results in greater economics of energy costs, since the heat released during the reaction can immediately be used for the decomposition of the intermediate formed. The purity of the resulting products is improved further and higher yields are achieved as well.

The novel process will be illustrated by the following non-limiting example:

EXAMPLE

A thermostatically controlled glass autoclave 2 with an inside diameter of 81 mm and a length of 480 mm is packed with 611 g of granulated activated carbon Supersorbon K (grain size about 4 mm). Prior to the test, the entire autoclave is rinsed with an inert gas with exclusion of oxygen, and oxygen-free water is fed to the sump of the reactor 9 using the pump 8.

With the low conversions on a laboratory scale, the glass autoclave must be heated with a heat-exchanging oil to a reaction temperature of 115° C. The resulting heat of reaction is so readily dissipated by radiation in the case of a laboratory setup that a separate heat exchanger 12 can be dispensed with. Before the start of the reaction, the desired pressure is set with inert gas, and circulation is adjusted to 80 liters/h. The following stock streams are fed in measured portions:

Carbon disulfide: 94 g/h
Ammonia gas: 54 liters/h
Oxygen-free water
    (fed to waste gas cooler): 57 ml/h (absorption of degaser waste gases): 57 ml/h Depending upon the amount of water selected, an approximately 45 weight-% ammonium thiocyanate solution is drawn off from the degaser 15, depending on the amount of water selected.

Following gel-permeation chromatographic separation, an argentometrically determined content of ammonium thiocyanate of 99.8% is obtained. The colorimetrically analyzed thiourea content is 0.2%. The yield is 92.6 g/h of ammonium thiocyanate (99.6% of theoretical relative to ammonia). The space-time yield is 60.2 g of ammonium thiocyanate per hour and liter of catalyst.

We claim:

1. A process comprising reacting ammonia with carbon disulfide in the presence of water or a first aqueous ammonium thiocyanate solution and a catalytic amount of activated carbon in a reaction vessel to produce a second aqueous ammonium thiocyanate solution, said ammonia being reacted with said carbon disulfide in a single reaction zone to form intermediate, all of said intermediates being decomposed in situ in said single reaction zone at a temperature of from 90° to 150° C. and a pressure of from 2 to 7 bar.

2. The process as set forth in claim 1, wherein said carbon disulfide is gaseous.

3. The process as set forth in claim 1, wherein said temperature is between 110° and 120° C.

4. The process as set forth in claim 1, wherein said pressure is from 5 to 5.5 bar.

5. The process as set forth in claim 3, wherein said pressure is from 5 to 5.5 bar.

6. The process as set forth in claim 1, wherein said temperature and said pressure are maintained constant in said zone during the reaction and decomposition.

7. The process as set forth in claim 1, wherein heat released in reacting said ammonia with said carbon disulfide is used in decomposing said intermediates.

8. The process as set forth in claim 1, wherein said second ammonium thiocyanate solution is drawn off continuously and expanded to standard pressure and escaping gases are dissolved in water and returned to said reaction vessel.

9. The process as set forth in claim 1, wherein said second ammonium thiocyanate solution is drawn off continously and expanded to standard pressure and escaping gases are compressed and returned to said reaction vessel.

10. The process as set forth in claim 1, wherein said second aqueous ammonium thiocyanate solution is recycled and passed through a heat exchanger to dissipate heat of reaction.

11. The process as set forth in claim 1, wherein said reaction vessel comprises a packed bed reactor and said ammonia is reacted with said carbon disulfide in the presence of said first aqueous ammonium thiocyanate solution.

12. The process as set forth in claim 1, wherein said ammonia is metered into said reaction vessel in a liquid state.

13. The process as set forth in claim 1, wherein said ammonia is metered into said reaction vessel in a gaseous state.

14. The process as set forth in claim 1, wherein said ammonia is metered in a liquid state into said first aqueous ammonium thiocyanate solution.

15. The process as set forth in claim 1, wherein said ammonia is metered in a gaseous state into said first aqueous ammonium thiocyanate solution.

16. The process as set forth in claim 1, wherein said ammonia or said first aqueous ammonium thiocyanate solution is metered into said reaction vessel in counterflow with said carbon disulfide.

17. The process as set forth in claim 1, wherein said ammonia or said first aqueous ammonium thiocyanate solution is metered into said reaction vessel in parallel flow with said carbon disulfide.

18. The process as set forth in claim 1, wherein an amount of said water or a concentration of said first aqueous ammonium thiocyanate solution is so portioned that said second aqueous ammonium thiocyanate solution contains 40 to 50 weight percent of ammonium thiocyanate.

19. The process as set forth in claim 1, wherein molar ratio of said ammonia to said carbon disulfide is 2:1.02 to 2:1.1.

20. The process as set forth in claim 1, wherein said single reaction zone comprises the entire interior of said reaction vessel, said reaction vessel being substantially completely filled with said activated carbon.

21. The process as set forth in claim 1, wherein said intermediates are selected from the group consisting of ammonium dithiocarbamate and ammonium trithiocarbonate.

* * * * *

UNITED STATES PATENT AND TRADEMARK OFFICE
CERTIFICATE OF CORRECTION

PATENT NO. : 5,026,534
DATED : June 25, 1991
INVENTOR(S) : Gerhard MEYER et al It is certified that error appears in the above-identified patent and that said Letters Patent is hereby corrected as shown below:

Col. 1,  line 25, change "processers" to --processes--;
             line 40, change "a" to --as--.
    Col. 3,  line 10, change "thicyanate" to --thiocyanate--.
    Col. 7,  line 40, change "counter flow" to --counterflow--;
             line 45, change "continously" to --continuously--.

Col. 10, claim 18, line 32, change "portioned" to --proportioned--.

Signed and Sealed this

Thirteenth Day of October, 1992

Attest:

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 5,026,534　　　　　　　　　　　　　　　　Page 1 of 2

DATED : June 25, 1991

INVENTOR(S) : Gerhard MEYER, Gunter SUDHEIMER, Hans ZENGEL and Hans GROTHAUS

It is certified that error appears in the above-identified patent and that said Letters Patent is hereby corrected as shown below:

ON THE TITLE PAGE:

In the drawing figure, change "C" to --c--.

In Fig. 1, change "C" to --c--.

Column 1, line 45, change "constitutents" to --constituents--.

Column 3, line 58, change "one" to --zone--.

Column 6, line 54, after "ammonia" insert --react--.

Column 7, line 22, delete "Lurg."

UNITED STATES PATENT AND TRADEMARK OFFICE
CERTIFICATE OF CORRECTION

PATENT NO. : 5,026,534

DATED : June 25, 1991

INVENTOR(S) : Gerhard Meyer, ET AL

It is certified that error appears in the above-identified patent and that said Letters Patent is hereby corrected as shown below:

Column 9, line 45 (claim 9), change "continously" to --continuously--.

Signed and Sealed this

Sixteenth Day of February, 1993

Attest:

STEPHEN G. KUNIN

Attesting Officer

Acting Commissioner of Patents and Trademarks